(12) United States Patent
Nippa et al.

(10) Patent No.: US 7,417,087 B2
(45) Date of Patent: Aug. 26, 2008

(54) PROCESS FOR PRODUCING RESIN COMPOSITION USING POWDER OF ALUMINUM-CONTAINING INORGANIC COMPOUND HAVING SPECIFIC BET SURFACE AREA AND PORE VOLUME AND RESIN COMPOSITION OBTAINED ACCORDING TO SAID PROCESS

(75) Inventors: Satoru Nippa, Niihama (JP); Hiroyoshi Nakajima, State College, PA (US); Kenji Atarashi, Sodegaura (JP)

(73) Assignee: Sumitomo Chemical Company, Limited, Osaka (JP)

(*) Notice: Subject to any disclaimer, the term of this patent is extended or adjusted under 35 U.S.C. 154(b) by 0 days.

(21) Appl. No.: 10/242,787

(22) Filed: Sep. 13, 2002

(65) Prior Publication Data

US 2003/0119963 A1    Jun. 26, 2003

(30) Foreign Application Priority Data

Sep. 14, 2001   (JP) .............................. 2001-279523
Sep. 14, 2001   (JP) .............................. 2001-279525

(51) Int. Cl.
*C08K 3/10*      (2006.01)
*C08L 23/10*    (2006.01)

(52) U.S. Cl. ...................... 524/437; 524/430; 524/444; 524/582; 524/584

(58) Field of Classification Search ................. 524/430, 524/437, 444, 445
See application file for complete search history.

(56) References Cited

U.S. PATENT DOCUMENTS

| | | | |
|---|---|---|---|
| 4,120,943 A * | 10/1978 | Iwaisako et al. ............. 423/628 |
| 5,079,287 A * | 1/1992 | Takeshi et al. ............... 524/528 |
| 5,093,197 A * | 3/1992 | Howard et al. ............... 428/372 |
| 5,620,774 A | 4/1997 | Etchu et al. | |
| 6,191,223 B1 * | 2/2001 | Dolle et al. .................. 525/191 |
| 6,417,286 B1 * | 7/2002 | Agostini et al. ........... 525/332.6 |
| 6,441,063 B1 * | 8/2002 | Kudo et al. .................. 523/218 |
| 2003/0035944 A1 * | 2/2003 | Blackwell .................... 428/328 |

FOREIGN PATENT DOCUMENTS

| | | |
|---|---|---|
| EP | 0 577 846 A1 | 1/1994 |
| EP | 1 095 984 A1 | 5/2001 |
| JP | 55-12460 B2 | 4/1980 |
| JP | 58-129036 A | 8/1983 |
| JP | 62-174243 A | 7/1987 |
| JP | 3-79649 A | 4/1991 |
| JP | 5-17637 A | 1/1993 |
| JP | 5-295190 A | 11/1993 |
| JP | 6-220271 A | 8/1994 |
| JP | 11-181305 A | 7/1999 |
| JP | 11-310670 A | 11/1999 |
| JP | 2000-109637 A | 4/2000 |
| JP | 2000-297171 A | 10/2002 |
| WO | WO 00/57932 A2 | 10/2000 |

OTHER PUBLICATIONS

Wypych, George. Handbook of Fillers, 2nd Edition. Toronto, Plastics Design Library, 2000, pp. 20, 99. TP1114.W96.*

* cited by examiner

*Primary Examiner*—Vasu Jagannathan
*Assistant Examiner*—Vickey Ronesi
(74) *Attorney, Agent, or Firm*—Birch, Stewart, Kolasch & Birch, LLP

(57) ABSTRACT

A resin composition, wherein the composition contains a thermoplastic resin and an aluminum-containing inorganic compound; the thermoplastic resin and the aluminum-containing inorganic compound form a parent phase and a dispersed phase, respectively; and the following inequality (1)

$$0 < d \leq -0.0997 \phi + 2.97 \qquad (1)$$

is satisfied, in which a wall-to-wall distance of the dispersed phases and a content of the aluminum-containing inorganic compound based on the weight of the resin composition are taken as d ($\mu$m) and $\phi$ (% by weight), respectively; is produced by melt-blending a thermoplastic resin with an aluminum-containing inorganic compound powder having a BET specific surface area of from 30 to 500 m$^2$/g, a maximum particle diameter of not more than 20 $\mu$m, and a pore volume of pores having a radius of from 50 to 1000 nm measured by a mercury porosimetry of not less than 0.3 cm$^3$/g.

6 Claims, No Drawings

PROCESS FOR PRODUCING RESIN COMPOSITION USING POWDER OF ALUMINUM-CONTAINING INORGANIC COMPOUND HAVING SPECIFIC BET SURFACE AREA AND PORE VOLUME AND RESIN COMPOSITION OBTAINED ACCORDING TO SAID PROCESS

FIELD OF THE INVENTION

The present invention relates to a process for producing a resin composition exhibiting a high stiffness and a sufficient surface hardness, and a resin composition obtained according to said process.

BACKGROUND OF THE INVENTION

Thermoplastic resins such as polyolefins, polyesters, polyamides and polyacetals are superior in their processability, chemical resistance and electrical property, and therefore molded into an injection-molded product, a blow-molded product, a film, a sheet and fiber to be used for various applications. However, if the product is made of only resin, the product is inferior in its stiffness and surface hardness, and has been sometimes limited in its applications.

It is so far known that an inorganic compound is filled to a resin to improve stiffness and surface hardness of a thermoplastic resin molded product (for example, JP-A 5-295190, JP-A 11-310670 and JP-A 2000-109637). However, the stiffness and the surface hardness of the resulting products are not sufficient even in such a manner, and a further improvement has been desired.

SUMMARY OF THE INVENTION

An object of the present invention is to provide a process for producing a resin composition exhibiting a high stiffness and a sufficient surface hardness.

The present inventors have studied a process for producing a resin composition improved in its mechanical property.

The present invention provides a process for producing a resin composition, which comprises melt-blending a thermoplastic resin with an aluminum-containing inorganic compound powder having a BET specific surface area of from 30 to 500 $m^2/g$, a maximum particle diameter of not more than 20 μm, and a pore volume of pores having a radius of from 50 to 1000 nm measured by mercury porosimetry of not less than 0.3 $cm^3/g$.

The present invention also provides a resin composition obtained according to the above-defined process, that is, a resin composition, wherein the composition comprises a thermoplastic resin and an aluminum-containing inorganic compound; the thermoplastic resin and the aluminum-containing inorganic compound form a continuous phase and a dispersed phase, respectively; and the following inequality (1)

$$0 < d \leq -0.0997\,\phi + 2.97 \tag{1}$$

is satisfied, in which a wall-to-wall distance of the dispersed phases (hereinafter referred to as "ligament thickness") and a content of the aluminum-containing inorganic compound based on the weight of the resin composition are taken as d (μm) and φ (% by weight), respectively.

DETAILED EXPLANATION OF THE INVENTION

According to the process of the present invention, the thermoplastic resin and the aluminum-containing inorganic compound powder are melt-blending with each other.

Examples of the thermoplastic resin used are olefin polymers such as polyethylene and polypropylene; polyesters such as polyethylene terephthalate, polybutylene terephthalate, polycaprolactone and polyhydroxybutylate; polyamides such as aliphatic polyamides such as nylon-6, nylon-66, nylon-10, nylon-12 and nylon-46, and aromatic polyamides obtained from aromatic dicarboxylic acids and aliphatic diamines; polyacetals such as polyformaldehyde (polyoxymethylene), polyacetaldehyde, polypropionaldehyde and polybutylaldehyde; polystyrenes; polyarylene sulfides (PAS) such as polyphenylene sulfide (PPS); polysulfones; polyether sulfones (PES); polyphenylene ethers (PPE); polyether ether ketones (PEEK); and natural rubber (NR), butadiene rubber (BR), styrene-butadiene copolymer rubber (SBR), polyisoprene (IR), butyl rubber (IIR), acrylonitrile-butadiene rubber (NBR), acrylonitrile-styrene-butadiene copolymer rubber, chloroprene rubber, ethylene-propylene copolymer rubber, styrene-isoprene copolymer rubber, styrene-isoprene-butadiene copolymer rubber, isoprene-butadiene copolymer rubber, chlorosulfonated polyethylene, acrylic rubber, epichlorohydrin rubber, polysulfide rubber, silicone rubber, fluororubber and urethane rubber. Of these, olefin polymers are preferred. The olefin polymers are explained in detail as follows.

Suitably used olefin polymers are ethylene polymers, propylene polymers or polymers obtained by polymerizing one or more diene compound monomers (hereinafter referred to as "diene polymer").

The ethylene polymers include ethylene homopolymers, ethylene-propylene copolymers and ethylene-α-olefin copolymers. The α-olefin used herein is that having 4 to 20 carbon atoms. Examples thereof are 1-butene, 1-pentene, 1-hexene, 1-octene and 1-decene. Examples of the ethylene-α-olefin copolymers are ethylene-1-butene copolymer, ethylene-1-pentene copolymer, ethylene-1-hexene copolymer, ethylene-1-octene copolymer and ethylene-1-decene copolymer.

The propylene polymers include propylene homopolymers, propylene-ethylene random copolymers, propylene-α-olefin random copolymers, propylene-ethylene-α-olefin random copolymers and polypropylene copolymers comprising either a propylene homopolymer component or a propylene copolymer component obtained by polymerizing propylene with a minor amount of one or more other monomers, and a copolymer component comprising propylene and ethylene and/or another α-olefin (hereinafter referred to as "polypropylene block copolymer). Examples of the propylene-α-olefin random copolymers are propylene-1-butene random copolymer, propylene-1-hexene random copolymer and propylene-1-octene random copolymer. Examples of propylene-ethylene-α-olefin random copolymers are propylene-ethylene-1-butene random copolymer, propylene-ethylene-1-hexene random copolymer and propylene-ethylene-1-octene random copolymer. Examples of the polypropylene block copolymer are a copolymer comprising a propylene homopolymer component and a propylene-ethylene copolymer component [hereinafter expressed by "(propylene)-(propylene-ethylene) copolymer"], (propylene)-(propylene-ethylene-1-butene) copolymer, (propylene)-(propylene-ethylene-1-hexene) copolymer, (propylene)-(propylene-1-butene) copolymer, (propylene)-(propylene-1-hexene) copolymer, (propylene-ethylene)-(propylene-ethylene)

copolymer, (propylene-ethylene)-(propylene-ethylene-1-butene) copolymer, (propylene-ethylene)-(propylene-ethylene-1-hexene) copolymer, (propylene-ethylene)-(propylene-1-butene) copolymer, (propylene-ethylene)-(propylene-1-hexene) copolymer, (propylene-1-butene)-(propylene-ethylene) copolymer, (propylene-1-butene)-(propylene-ethylene-1-butene) copolymer, (propylene-1-butene)-(propylene-ethylene-1-hexene) copolymer, (propylene-1-butene)-(propylene-1-butene) copolymer and (propylene-1-butene)-(propylene-1-hexene) copolymer.

The diene polymer includes those obtained by polymerizing a diene compound such as 1,3-butadiene, 1,4-hexadiene, dicyclopentadiene methylenenorbornene and ethylidenenorbornene. Examples thereof are ethylene-propylene-dicyclopentadiene copolymer and ethylene-propylene-ethylidenenorbornene.

In the present invention, a modified polyolefin obtained by modifying the olefin polymer described above with an unsaturated carboxylic acid, its derivative or an unsaturated silane compound may be used. The modified polyolefin and the olefin polymer described above may be used singly or in combination of two or more. Among the olefin polymers described above and the modified polyolefins, more preferred are propylene homopolymer, (propylene)-(propylene-ethylene) copolymer, (propylene)-(propylene-1-butene) copolymer, propylene-ethylene random copolymer, propylene-1-butene random copolymer and propylene-ethylene-1-butene random copolymer.

The aluminum-containing inorganic compound powder (hereinafter abbreviated as "powder") used in the present invention is a metal oxide or a metal hydroxide, which contains aluminum as an essential component. Examples thereof are clay, an aluminum oxide (hereinafter referred to as "alumina") and an aluminum hydroxide.

The powder has a BET specific surface area of not less than 30 m$^2$/g. When the BET specific surface area of the powder is less than 30 m$^2$/g, it sometimes is difficult to obtain a resin composition exhibiting a high stiffness and a sufficient surface hardness. The powder with higher BET specific surface area is preferable, because the stiffness of the resin composition tends to become higher with the increase of the BET specific surface of the powder. For example, the BET specific surface area of the powder is preferably not less than 60 m$^2$/g, and more preferably not less than 120 m$^2$/g. On the other hand, when the BET specific surface area is too large, the powder is easy to coagulate, and as a result, it becomes difficult to uniformly disperse the powder in the resin. Therefore, the BET specific surface area of the powder is not more than 500 m$^2$/g, preferably not more than 350 m$^2$/g, and more preferably not more than 300 m$^2$/g. Further, the powder has a maximum particle diameter of not more than 20 μm, and preferably not more than 15 μm. When the maximum particle diameter of the powder exceeds 20 μm, the resin composition may have surface roughness, or is inferior in tensile strength and flexural strength thereof. Furthermore, the powder has a pore volume of pores having a radius of from 50 to 1000 nm of not less than 0.3 cm$^3$/g by mercury porosimetry. When the pore volume of the powder is less than 0.3 cm$^3$/g, the resin composition exhibiting a high stiffness can hardly be obtained, and moreover the tensile strength and bending strength of the resin composition may decrease, or the resin composition obtained may have surface roughness. The pore volume of pores having a pore radius of from 50 to 1000 nm of the powder ranges preferably from 0.4 cm$^3$/g (inclusive) to 2 cm$^3$/g (inclusive). The powder having the above-specified specific surface area, maximum particle diameter and pore volume is usually composed of fine particles of the powder which are loosely aggregated with one another and can be easily dispersed by means of melt-blending described below.

Clay used here is composed of aluminum and either water or a hydroxyl group, and additionally silicon, iron, magnesium, an alkali metal or an alkaline earth metal. Specific examples thereof are allophane, kaolin, halloysite, montmorillonite and hydrotalcite. The alumina or aluminum hydroxide can be represented by formula (2),

$$Al_2O_m(OH)_{6-2m} \quad (2)$$

wherein m is 0 to 3. The former (alumina) is a compound wherein m in the foregoing formula (2) is usually 3, of which the crystalline form is expressed by α, γ, δ, κ, η, θ, σ, χ, ι or ρ, or which is amorphous. The latter (aluminum hydroxide) is a compound wherein m in the foregoing formula (2) ranges from 0 to 2.5, which has a structure such as gibbsite [Al(OH)$_3$], bayerite [Al(OH)$_3$], boehmite [AlO(OH)] or pseudo-boehmite, or which is amorphous. The aluminum hydroxide of the pseudo-boehmite structure shows X-ray diffraction spectra similar to those of boehmite when its crystal structure is analyzed by X-ray diffraction method, and is the compound of the foregoing formula (2) wherein usually m ranges from 1.5 to 2. The amorphous aluminum hydroxide has no peak of any crystal in its X-ray diffraction spectra and is the compound of the foregoing formula (2) wherein usually m ranges from 0.5 to 2.5. In the present invention, the alumina and the aluminum hydroxide, as well as boehmite or pseudo-boehmite are suitably used.

A process for producing the powder having the specified specific surface area, maximum particle diameter and pore volume is explained as follows. For example, aluminum hydroxide powder can be prepared as follows. Thus, for example, an aluminum alkoxide is hydrolyzed to obtain an aluminum hydroxide having a loosed bulk density of from 0.4 g/cm$^3$ or more, preferably 0.6 g/cm$^3$ or more, and of 0.9 g/cm$^3$ or less, preferably 0.8 g/cm$^3$ or less; the aluminum hydroxide is suspended in an aqueous medium such as water and aged; and thereafter the resulting slurry is dried. The aging can be carried out in a manner such that the aluminum hydroxide is held in an aqueous medium of a pH of from 3 or more, preferably 8 or more, and of 12 or less, preferably 11 or less, at a temperature of from 90° C. or higher, and 150° C. or lower, for a period of from 10 hours or more, and 100 hours or less. At this time, the pH can be controlled by adding an acid or an alkali to the slurry. The drying can be carried out using an flush drier or hot-air transfer type drier (hereinafter referred to as "drier"), e.g., a commercial name of "Flush Jet Drier FJD-4 inch type", manufactured by Seishin Enterprise Co., Ltd. At this time, it is preferable that an inlet temperature and inlet pressure (gauge pressure) of the drier are controlled to be within the range of from 350° C. to 450° C. and positive pressure, namely within the approximate range of from 1000 to 5000 mmAq (9900 to 49000 Pa), respectively, and an outlet temperature and outlet pressure (gauge pressure) of the drier are controlled to be within the range of from 250° C. to 350° C. and negative pressure, namely within the approximate range of from 0 to −1000 mmAq (0 to −9900 Pa), respectively. Further, before drying, it is preferable to remove coarse particles, for example, those having a particle diameter of 45 μm or more, through classification such as sieving in advance. Up to here, an instance where the powder comprises the aluminum hydroxide is explained. When the powder comprises clay, a complex alkoxide containing silicon and aluminum is hydrolyzed to obtain an aluminum silicate having a loosed bulk density of from 0.4 g/cm$^3$ or more, preferably 0.6 g/cm$^3$ or more, and of 0.9 g/cm³ or less, preferably 0.8 g/cm³ or less, followed by suspension, and aging, thereby obtaining a desired powder.

The powder may be subjected to surface-treatment. A surface-treating agent usable therefor includes, for example, alkyl phosphates, stearic acid, rosin, silane coupling agents and titanate coupling agents. The surface-treating agent is used in an amount of 0.01 part by weight or more, preferably 0.5 part by weight or more, and of 15 parts by weight or less, preferably 10 parts by weight or less, and more preferably 5 parts by weight or less, based on 100 parts by weight of the powder. The surface-treatment can be carried out according to, for example, a process comprising the steps of adding the above-described surface-treating agent to a slurry comprising the powder and a solvent, and heating the resulting mixture by means of drier; a process comprising the steps of adding the surface-treating agent to the powder, and mixing both with each other; or a process comprising the steps of adding the surface-treating agent to the powder, mixing both with each other and then heating the resulting mixture.

The powder is used in an amount of usually 0.001% by weight or more, preferably 0.01% by weight or more, and more preferably 0.1% by weight or more, based on the weight of the resin composition obtained. While, from a viewpoint of improving impact strength thereof, the amount of the powder is preferably 10% by weight or less, more preferably 5% by weight or less, and particularly preferably 3% by weight or less, based on the weight of the resin composition obtained.

The melt-blending can be carried out, for example, in a manner such that the thermoplastic resin and a pre-determined amount of the surface-treated or surface-untreated powder are mixed with each other, and the resulting mixture is supplied to an apparatus such as a single screw extruder, a twin screw extruder or a kneader; or in a manner such that the thermoplastic resin and a pre-determined amount of the surface-treated or surface-untreated powder are separately supplied to the above-described apparatus. The kneading can be carried out at a temperature at which the thermoplastic resin is melted. The temperature is usually 160° C. or higher, and 280° C. or lower, preferably 250° C. or lower, more preferably 200° C. or lower. The kneading may be carried out in a batch manner or in a continuous manner.

In the present invention, in melt-blending the thermoplastic resin and the powder, it is permitted to add an additive and a filler other than the powder as described above. Examples of the additive are antioxidant, neutralizing agent, weatherproof agent, ultraviolet absorber, copper-contamination-preventing agent, lubricant, processing aid, plasticizer, dispersant, antiblocking agent, anti-static agent, nucleating agent, flame retardant, foaming agent, antifoaming agent, cross-linking agent, coloring agent, pigment. In the present invention, in order to highly uniformly disperse the powder in the thermoplastic resin, a master batch may be prepared by melt-blended the thermoplastic resin and the powder, and successively the thermoplastic resin may be added thereto, and then blended. In preparing the master batch, an upper limit of the amount of the powder is 70% by weight, and preferably 65% by weight, based on the weight of the master batch.

In the resin composition obtained in the present invention, the powder forms a dispersed phase in a resin as matrix, and when a ligament thickness and a content of the powder based on the weight of the resin composition are taken as d (μm) and φ (% by weight), respectively, the ligament thickness of the resin composite d satisfies the foregoing inequality (1), preferably d satisfies inequality (3), $$0 < d \leq -0.0997\phi + 2.00 \quad (3)$$

and more preferably d satisfies inequality (4), $$0 < d \leq -0.0997\phi + 1.60 \quad (4).$$

Incidentally, the ligament thickness can be determined in a manner such that ultrathin sections of resin composition are prepared, and then its transmission electron micrographs are taken. The ligament thickness in the micrographs are measured.

The present resin composition is usually subjected to injection molding, extrusion molding, vacuum molding, blow molding, press molding, profile extrusion molding, or foam molding, thereby obtaining a molded product. The present resin composition or its molded product can exhibit a high stiffness and a sufficient surface hardness.

The present invention is explained in more detail with reference to Examples as follows, but the present invention is not limited to these Examples. Measurement methods for obtaining values of physical properties appearing in Examples are as follows.

[Thermoplastic Resin]

(i) Intrinsic Viscosity (dl/g) [η]

It was measured using Ubbelohde viscometer. With respect to the propylene homopolymer, the measurement was carried out at 135° C. using tetralin as a solvent. With respect to the ethylene-propylene random copolymer portion, the measurement was carried out at 70° C. using xylene as a solvent.

(i-1) Intrinsic Viscosity [η] P of the Propylene Homopolymer Portion in the Ethylene-Propylene Block Copolymer The propylene homopolymer was taken out from the polymerization vessel after completion of first step polymerization for obtaining the propylene homopolymer portion in the course of production of the ethylene-propylene block copolymer, and an intrinsic viscosity of the propylene homopolymer taken out was measured and taken as [η] P.

(i-2) Intrinsic Viscosity [η] EP of the Ethylene-Propylene Random Copolymer Portion in the Ethylene-Propylene Block Copolymer It was calculated from an intrinsic viscosity [η] T of the ethylene-propylene block copolymer, the above-described [η] P, and a weight ratio X of the ethylene-propylene random copolymer portion using the following equation.

$$[\eta]EP = [\eta]T/X - (1/X - 1)[\eta]P$$

Incidentally, the weight ratio X was obtained as follows. Thus, in 10 mmφ test tube, 200 mg of the ethylene-propylene block copolymer was uniformly dissolved in 3 ml of o-dichlorobenzene to prepare a sample. With respect to the sample, $^{13}$C-NMR spectra were measured under the following conditions.

Measurement temperature: 135° C., pulse repeating time: 10 seconds, pulse width: 45°, and integrating revolution: 2500 times. The weight ratio X was found from the spectra according to the description in Macromolecules, 1982, vol. 15, 1150 to 1152, reported by Kakugo at. al.

(ii) Ethylene Unit Content (% by Weight) in the Ethylene-propylene Block Copolymer It was determined in a manner similar to that described above for the weight ratio X.

[Aluminum-containing Inorganic Compound (Powder)]

(iii) BET Specific Surface Area (Unit: m$^2$/g)

It was measured according to a nitrogen absorption method.

(iv) Maximum Particle Diameter (Unit: μm)

The sample was suspended in a 0.2 weight % sodium hexametaphosphate aqueous solution, and an ultrasonic wave was applied to the suspension for 5 minutes from an ultrasonic homogenizer (out-put 40W) annexed to a particle size distribution analyzer described below. After completion of the ultrasonic wave application, using a laser scattering particle size distribution analyzer (a commercial name of Microtrac HRA X-100, manufactured by Leed & Northrup), a particle size distribution curve was obtained with an accumulative weight as a vertical axis and a particle diameter as a horizontal axis, and the particle diameter giving an accumulative weight of 0.1% by weight in the curve was taken as the maximum particle diameter. Incidentally, the accumulative weight as the vertical axis in the particle size distribution curve was a value obtained by integrating the weight of the particles not larger than 1000 μm with decreasing particle size.

(v) Pore Volume (cm$^3$/g)

A pore distribution of the sample was measured by a mercury porosimeter (a commercial name of Autoscan, #33, manufactured by Quantachrome). Successively, an accumulative pore distribution curve was obtained with a pore radius as a horizontal axis and an accumulative pore volume as a vertical axis, and an accumulative volume of the pores having the pore radius between 50 nm and 1000 nm was obtained.

(vi) Crystal Structure

The sample was analyzed using an X-ray diffraction apparatus (a commercial name of RAD-RB RU-200, manufactured by RIGAKU Corporation), and its crystal structure was identified from peak data in the obtained X-ray diffraction spectra.

(vii) Loosed Bulk Density (g/cm$^3$)

It was measured according to JIS-H-1902 using a cylinder of a 15 cm$^3$ volume.

[Resin Composition]

(viii) Ligament Thickness d (μm)

A resin composition having a thickness of 1 mm was molded by hot press at 180° C., and ultrathin sections of the composition having thickness of less than 1000 Å were prepared at 80° C. with ultramicrotome. The dispersibility of the aluminum hydroxide in the ultrathin sections was evaluated at 6000 magnifications using a transmission electron microscope ("H-8000", manufactured by Hitachi, Ltd.), and a two dimensional image obtained in the above manner was processed according to the following "image analysis treatment" using a high-accuracy image analyzing software (a commercial name of "IP-1000", manufactured by Asahi Engineering Co., Ltd.), thereby determining the ligament thickness.

[Image Analysis Treatment]

The resin composition was formed into the ultrathin sections having a thickness of less than 1000 Å, and a transmission electron micrograph thereof was taken with respect to arbitrarily adjacent two dispersed phases (aluminum hydroxide) in a two dimensional image of the photograph, their radii, $r_{i1}$ and $r_{i2}$, and a distance between their bary-centers, Di, are determined. When the dispersed phase in the two dimensional image is not a proper circle, it is permitted to determine the radius and the distance between the bary-centers as an approximation of circle. Successively, using the sum of the radii Ri ($=r_{i1}+r_{i2}$) and Di, di is calculated according to equation (5), $$di = Di - Ri \quad (5).$$

With respect to different combinations of two dispersion phases, the same operation is repeated n times (not less than 20 times), and the results are averaged according to equation (6), $$d = \left(\sum_{i=1}^{n} di\right)\bigg/n \quad (6)$$

thereby determining the wall-to-wall distance of the disperse phases.

(ix) Melt Index MI (g/10 min)

It was measured according to JIS-K-6758. The measurement temperature and load were 230° C. and 2.16 kg, respectively.

(x) Stiffness (kgf/cm$^2$)

It was measured according to JIS-K-7106. A test piece having a thickness of 1 mm molded by hot press molding at 180° C. was used. The measurement temperature was 23° C.

(xi) Izod Impact Strength (kgf·cm/cm$^2$)

It was measured according to JIS-K-7110. A test piece having a thickness of 5 mm molded by hot press molding at 180° C. was used, and after molding, it was subjected to notch-processing, thereby evaluating a notched impact strength. The measurement temperature was 23° C.

(xii) Rockwell Hardness (R Scale)

It was measured according to JIS-K-7202, and evaluated using a test piece having a thickness of 5 mm molded by hot press molding at 180° C. and a steel ball R. The results were expressed by R scale.

Materials abbreviated in Examples are as follows.

PP1: Ethylene-propylene block copolymer ([η] P: 1.2 dl/g, [η] T: 1.4 dl/g, [η] EP: 2.3 dl/g, X: 15% by weight, ethylene unit content: 5.9% by weight)

PP2: Propylene homopolymer

PP3: Ethylene-propylene block copolymer ([η] P: 1.3 dl/g, [η] T: 1.4 dl/g, [η] EP: 2.4 dl/g, X: 14% by weight, ethylene unit content: 5.25% by weight)

ATH1: Aluminum hydroxide (BET specific surface area: 153 m$^2$/g, maximum particle diameter: 13.08 μm, volume of pores having a pore radius of from 50 to 1000 nm: 0.81 cm$^3$/g, loosed bulk density: 0.17 g/cm$^3$, crystal structure: boehmite); 3760 grams of aluminum hydroxide powder (loosed bulk density: 0.77 g/cm$^3$) obtained by hydrolyzing an aluminum alkoxide and 50 kg of water was mixed. The mixture having a solid concentration of 7% by weight was passed through a continuous type beads mill, and as a result, the aluminum hydroxide aqueous slurry was obtained. The suspension was introduced into a stainless steel made drum can, and a 1N sodium hydroxide aqueous solution was added thereto, thereby adjusting a pH of the slurry to 10. The stainless steel made drum can was equipped with a refluxing apparatus, and thereafter, the slurry was heated at 100° C. for 60 hours. The slurry was gradually cooled, thereafter, coarse particles having a particle diameter of not less than 45 μm was removed through sieve-classification, and the remaining portion was dried using a flush drier (a commercial name of Flush Jet Drier FJD-4 inch type, manufactured by Seishin Enterprise Co., Ltd.). At this time, the drier was operated under the following conditions; inlet temperature: 400° C., inlet wind pressure (gauge pressure): 3000 mmAq (29600 Pa), outlet temperature: 300° C. and outlet wind pressure (gauge pressure): −100 mmAq (−985 Pa).

ATH2: Aluminum hydroxide: 3760 grams of aluminum hydroxide powder (loosed bulk density: 0.77 g/cm$^3$) obtained by hydrolyzing an aluminum alkoxide and 50 kg of water was mixed. The mixture having a solid concentration of 7% by weight was passed through a continuous type beads mill, and as a result, the aluminum hydroxide aqueous slurry was obtained. A silane coupling agent (a commercial name of A-174, manufactured by Nippon Unicar Company Limited) in an amount of 5 parts by weight relative to 100 parts by weight of the aluminum hydroxide was added to and mixed uniformly with the slurry. The resulting mixture was introduced into a stainless steel made drum can, and a 1N sodium hydroxide aqueous solution was added thereto, thereby adjusting a pH of the slurry to 10. The stainless steel made drum can was equipped with a refluxing apparatus, and thereafter, the slurry was heated to and maintained at 100° C. for 60 hours. The suspension was gradually cooled, thereafter, coarse particles having a particle diameter of not less than 45 μm was removed through sieve-classification, and the remaining portion was dried using a flush drier (a commercial name of Flush Jet Drier FJD-2 inch type, manufactured by Seishin Enterprise Co., Ltd.). At this time, the drier was operated under the following conditions; inlet temperature: 350° C., inlet wind pressure (gauge pressure): 2750 mmAq (27100 Pa), outlet temperature: 275° C. and outlet wind pressure (gauge pressure): −100 mmAq (−985 Pa).

ATH3: Aluminum hydroxide (BET specific surface area: 6 m$^2$/g, maximum particle diameter: 6.5 μm, volume of pores having a pore radius of from 50 to 1000 nm: 0.94 cm$^3$/g, loosed bulk density: 0.115 g/cm$^3$, crystal structure: boehmite): In an autoclave, 1 liter of a sodium hydroxide aqueous solution having a Na$_2$O concentration of 3 g/l and 350 g of an aluminum hydroxide powder (a commercial name of C-301, loosed bulk density: 0.25 g/cm$^3$, manufactured by Sumitomo Chemical Co., Ltd.) were introduced, the autoclave was closed hermetically, thereafter the temperature was raised to 180° C., and the mixture was kept for 2 hours while stirring at that temperature. After keeping, the mixture was cooled to obtain a suspension, which was filtered, and the resulting solid matter was washed and dried.

EXAMPLE 1

99.5% by weight of PP1, 0.5% by weight of ATH1 and additives were mixed, and thereafter using a twin screw extruder (a commercial name of KZW15-45MG, unidirectional rotation type, screw 15 mm×45 L/D, manufactured by Technovel Corporation), the mixture was melt-blended under conditions of a temperature set of 180° C. and a screw rotating speed of 500 rpm to obtain a resin composition. Physical properties and evaluation results in this Example are as shown in Table 1 and Table 2, respectively. The additives used above were a commercial name of AR-2, manufactured by Kyodo Chemical Co., Ltd., a commercial name of GA-80, manufactured by Sumitomo Chemical Co., Ltd., and a commercial name of ULTRANOX 626, manufactured by GE Specialty Chemicals, and their amounts added were 0.05 part by weight, 0.05 part by weight and 0.1 part by weight per 100 parts by weight of PP1, respectively.

EXAMPLE 2

The same procedure as in Example 1 was repeated, except that the amounts of PP1 and ATH1 were changed to 98.5% by weight and 1.5% by weight, respectively.

EXAMPLE 3

The same procedure as in Example 1 was repeated, except that the amounts of PP1 and ATH1 were changed to 92.5% by weight and 7.5% by weight, respectively.

EXAMPLE 4

The same procedure as in Example 2 was repeated, except that ATH2 was used in place of ATH1.

COMPARATIVE EXAMPLE 1

The same procedure as in Example 1 was repeated, except that PP2 was used in an amount of 100% by weight, and no ATH1 was used.

COMPARATIVE EXAMPLE 2

The same procedure as in Example 2 was repeated, except that ATH3 was used in place of ATH1.

COMPARATIVE EXAMPLE 3

The same procedure as in Example 3 was repeated, except that ATH3 was used in place of ATH1.

TABLE 1

| | Termoplastic resin | Aluminum-containing inorganic compound | | MI g/10 min. | Ligament thickness μm | −0.0997 φ + 2.97 |
|---|---|---|---|---|---|---|
| | | | Amount φ (wt. %) | | | |
| Example 1 | PP1 | ATH1 | 0.5 | 14.3 | 1.47 | 2.92 |
| Example 2 | PP1 | ATH1 | 1.5 | 15.8 | 1.25 | 2.82 |
| Example 3 | PP1 | ATH1 | 7.5 | 11.6 | 0.72 | 2.22 |
| Example 4 | PP1 | ATH2 | 1.5 | 15.3 | 0.72 | 2.82 |
| Comparative Example 1 | PP2 | — | 0 | 15.2 | — | — |
| Comparative Example 2 | PP1 | ATH3 | 1.5 | 15.6 | 3.45 | 2.82 |
| Comparative Example 3 | PP1 | ATH3 | 7.5 | 15.0 | 2.44 | 2.22 |

TABLE 2

| | Stiffness kgf/cm$^2$ | Izod impact strength kgf·cm/cm$^2$ | | Rockwell hardness R scale |
|---|---|---|---|---|
| | | 23° C. | −30° C. | |
| Example 1 | 15,200 | 7.1 | 2.1 | 91.0 |
| Example 2 | 17,000 | 6.7 | 2.8 | 95.2 |
| Example 3 | 16,800 | 4.6 | 2.1 | 95.2 |
| Example 4 | 15,000 | 6.4 | 2.2 | 93.5 |
| Comparative Example 1 | 13,100 | 5.9 | 2.3 | 88.3 |
| Comparative Example 2 | 13,700 | 5.8 | 2.0 | 88.3 |

TABLE 2-continued

|  | Stiffness kgf/cm² | Izod impact strength kgf·cm/cm² | | Rockwell hardness |
|---|---|---|---|---|
|  |  | 23° C. | −30° C. | R scale |
| Example 2 Comparative Example 3 | 16,000 | 6.1 | 2.5 | 90.5 |

EXAMPLE 5

98.5% by weight of PP2, 1.5% by weight of ATH1 and additives were mixed, and thereafter using a twin screw extruder (a commercial name of KZW15-45MG, unidirectional rotation type, screw 15 mm×45 L/D, manufactured by Technovel Corporation), the mixture was melt-blended under conditions of a temperature set of 180° C. and a screw rotating speed of 500 rpm to obtain a resin composition. Evaluation results in this Example are shown in Table 3. The additives used above were a commercial name of AR-2, manufactured by Kyodo Chemical Co., Ltd., a commercial name of GA-80, manufactured by Sumitomo Chemical Co., Ltd., and a commercial name of ULTRANOX 626, manufactured by GE Specialty Chemicals, and their amounts added were 0.05 part by weight, 0.05 part by weight and 0.1 part by weight per 100 parts by weight of PP1, respectively.

EXAMPLE 6

The same procedure as in Example 5 was repeated, except that amounts of PP2 and ATH1 were changed to 85% by weight and 15% by weight, respectively.

EXAMPLE 7

The same procedure as in Example 5 was repeated, except that amounts of PP2 and ATH1 were changed to 70% by weight and 30% by weight, respectively.

COMPARATIVE EXAMPLE 4

The same procedure as in Example 5 was repeated, except that PP2 was used in an amount of 100% by weight, and no ATH1 was used.

COMPARATIVE EXAMPLE 5

The same procedure as in Example 5 was repeated, except that ATH2 was used in place of ATH1.

TABLE 3

| | Thermo-plastic resin | Aluminum-containing inorganic compound | | Stiffness kgf/cm² | Rockwell hardness R scale |
|---|---|---|---|---|---|
| | | | Amount (wt. %) | | |
| Example 5 | PP2 | ATH1 | 1.5 | 21,000 | 110.9 |
| Example 6 | PP2 | ATH1 | 15 | 25,100 | 109.0 |
| Example 7 | PP2 | ATH1 | 30 | 29,100 | 111.5 |
| Comparative Example 4 | PP2 | — | 0 | 18,100 | 101.4 |

TABLE 3-continued

| | Thermo-plastic resin | Aluminum-containing inorganic compound | | Stiffness kgf/cm² | Rockwell hardness R scale |
|---|---|---|---|---|---|
| | | | Amount (wt. %) | | |
| Example 4 Comparative Example 5 | PP2 | ATH3 | 1.5 | 18,700 | 108.4 |

EXAMPLES 8 TO 10 AND COMPARATIVE EXAMPLES 6 AND 7

The same procedure as in Examples 5 to 7 and Comparative Examples 4 and 5 was repeated, except that PP2 was replaced with PP3. Evaluation results in these Examples are as shown in Table 4.

TABLE 4

| | Thermo-plastic resin | Aluminum-containing inorganic compound | | Stiffness kgf/cm² | Rockwell hardness R scale |
|---|---|---|---|---|---|
| | | | Amount (wt. %) | | |
| Example 8 | PP3 | ATH1 | 1.5 | 21,000 | 110.9 |
| Example 9 | PP3 | ATH1 | 15 | 25,100 | 109.0 |
| Example 10 | PP3 | ATH1 | 30 | 29,100 | 111.5 |
| Comparative Example 6 | PP3 | — | 0 | 18,100 | 101.4 |
| Comparative Example 7 | PP3 | ATH3 | 1.5 | 18,700 | 108.4 |

Advantages of the Invention

According to the present invention, a resin composition having a high stiffness and a sufficient surface hardness can be provided.

What is claimed is:

1. A process for producing a resin composition, which comprises:
   melt-blending an olefin polymer as a thermoplastic resin with an aluminum-containing inorganic compound powder having a BET specific surface area of from 30 to 500 m²/g, a maximum particle diameter of not more than 20 μm, and a pore volume of pores having a radius of from 50 to 1000 nm measured by a mercury porosimetry of 0.4 to 2 cm³/g;
   wherein the aluminum-containing inorganic compound powder is selected from the group consisting of boehmite, pseudo-boehmite and an amorphous aluminum hydroxide.

2. The process according to claim 1, wherein the olefin polymer is a propylene polymer.

3. The process according to claim 1, wherein the BET specific surface area of the aluminum-containing inorganic compound powder ranges from 60 to 350 m²/g.

4. The process according to claim 1, wherein the BET specific surface area of the aluminum-containing inorganic compound powder ranges from 120 to 300 m²/g.

5. The process according to claim 1, wherein the maximum particle diameter of the aluminum-containing inorganic compound powder is not more than 15 μm.

6. A resin composition prepared by the process of claim 1, wherein the polyolefin and the aluminum-containing inorganic compound form a continuous phase and a dispersed phase, respectively; and the following inequality (1) is satisfied, in which a ligament thickness and a content of the aluminum-containing inorganic compound based on the weight of the resin composition are taken as d (μm) and φ (% by weight), respectively.

$$0 < d \leq -0.0997\phi + 2.97 \qquad (1)$$

* * * * *